Nov. 25, 1952  W. E. GLASSBURN  2,619,522
OVERCURRENT RELAY WITH INVERSE TIME CHARACTERISTIC
Filed Oct. 9, 1950

WITNESSES:
E.A. McCloskey
Nw. C. Groome

INVENTOR
William E. Glassburn.
BY
ATTORNEY

Patented Nov. 25, 1952

2,619,522

UNITED STATES PATENT OFFICE 2,619,522

OVERCURRENT RELAY WITH INVERSE TIME CHARACTERISTIC

William E. Glassburn, Bloomfield, N. J., assignor to Westinghouse Electric Corporation, East Pittsburgh, Pa., a corporation of Pennsylvania Application October 9, 1950, Serial No. 189,217

4 Claims. (Cl. 175—294)

The invention relates to electrical protective relays, and particularly to a relay having a variable operating characteristic depending upon the magnitude of a quantity in the circuit with which it is associated.

It is common, of course, to provide in a transmission line or electrical distribution system circuit breakers for interrupting portions of the circuit in response to abnormal circuit conditions, such, for example, as excessive value of current above a normal value and relays have been provided in the past for guarding against such condition.

In the case of conventional over-current relays, the relays usually operate with an inverse-time characteristic, that is, the higher the current value, above a preselected minimum value, the shorter will be the time of operation of the relay, and hence the shorter the time of interrupting the circuit by means of the circuit breaker. There are however conditions where, if the over-current is substantially above a certain value, it is desirable to speed the operation of the relay even more than usual to open the circuit breaker more quickly. For example, in the patent to Steeb, 2,372,134, an over-current relay having an inverse time characteristic is disclosed, and that characteristic is modified upon the appearance of a fault current of more than a predetermined magnitude to increase the energization of the upper windings 63 and 65 (in the patent) by connecting a portion of the main winding of the relay in parallel with such coils. This increases the speed of operation of the relay upon the occurrence of the excessive current condition.

It is an object of the present invention to provide in a protective relay device for an electrical circuit means responsive to a predetermined value of an electrical quantity of said circuit for modifying the normal operating characteristic of the relay, in a simple and expeditious manner, to obtain substantially instantaneous operation thereof.

Figure 1:
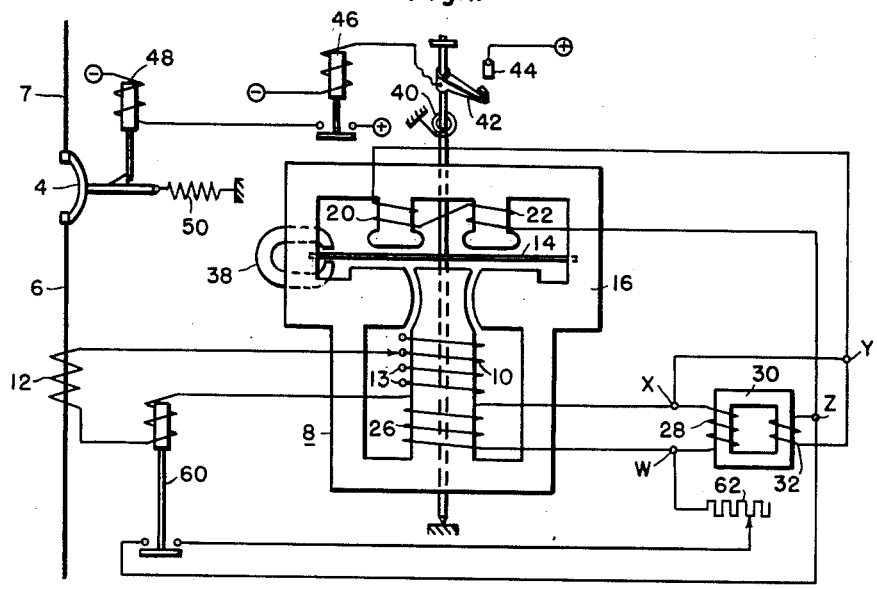
Figure 3:
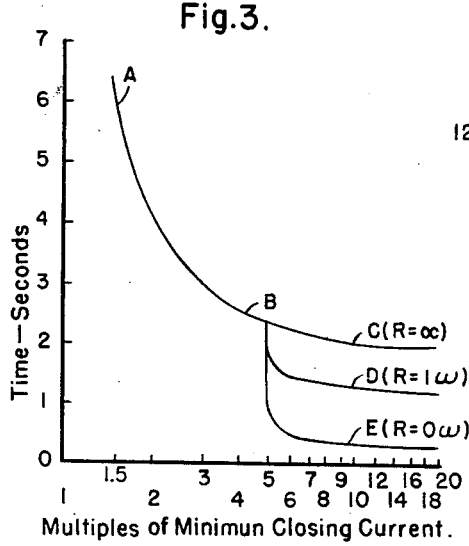
Figure 2:
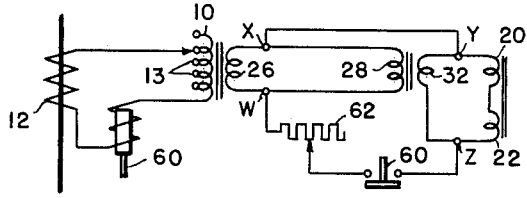
Figure 4:
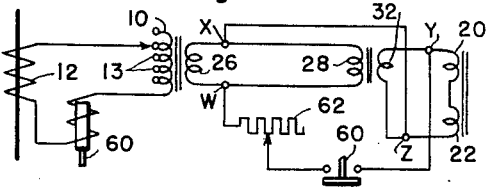

Further objects of the invention will be apparent from the following description and accompanying drawing, in which:

Figure 1 is a schematic view of a relay and its connections to an electrical circuit embodying the present invention, Fig. 2 is a schematic circuit diagram of the connection shown in Fig. 1, Fig. 3 is a set of curves showing the operating characteristics of the relays shown in Figs. 1 and 2, and Fig. 4 is a schematic wiring diagram of a modified circuit for the relay.

Referring to Fig. 1, a transmission line comprising sections 6 and 7 is provided with a circuit breaker 4 to control the connection and disconnection of such sections. The transmission line, of course, may be a three-phase alternating-current circuit in which case the circuit breaker 4 would either be of the three-pole or polyphase type, or three separate single-phase breakers could be employed. However, for purposes of illustrating the invention, the showing of the transmission line and breaker schematically in a single-line diagram is believed to be sufficient for an understanding of the invention.

A relay 8 may be a conventional over-current relay having a main winding 10 energized from a current transformer 12 which is, in turn, energized from the transmission line section 6. The winding 10 is usually provided with a plurality of taps 13 so that the degree of energization of the relay, or the response thereof, may be preselected in accordance with the operating conditions desired. The relay shown is of the induction-disk type in which a disk 14 mounted for rotation between pole pieces of an electromagnetic core 16, as indicated.

In addition to the flux resulting from the energization of the main winding 10, an additional flux is imposed on the disk by upper windings 20 and 22. To energize these windings 20 and 22 an additional winding 26 disposed upon the same leg of the core as the winding 10, is energized by transformer action from winding 10 and the output is imposed upon a winding 28 on the core 30 of a saturable transformer, the secondary winding 32 of which is connected to energize the windings 20 and 22.

The relay windings 10, 20 and 22, when energized, produce a shifting magnetic field in the gap between the pole pieces of the core 16, and the disc armature will be rotated thereby at a speed depending upon the degree of energization of such windings. A permanent magnet 38 may be employed to damp the rotation of the disc, and the rotation is resiliently restrained by a spring 40 acting upon the spindle of the disc.

The connections thus far described are more or less conventional and result in a relay having an operating characteristic which follows an inverse curve such as the curve A, B, C of Fig. 3, in which it will be noted that as the values of current increase, the time of operation of the relay decreases.

When the relay operates, the disc rotates to move its contact arm 42 against the restraining force of the spring 40 to ultimately engage a stationary contact 44. When these contacts close, a circuit is completed from the positive side of a suitable direct-current source through the winding of a contactor 46 to the negative side of such source. A usual source for control potentials for this purpose would be an electric storage battery.

The contactor 46 in picking-up closes the circuit between the positive side of the direct-current source, the winding of a trip device 48 and the negative side of the source. Normally the trip device 48 maintains the circuit breaker 4 in operated condition against the bias of a spring 50 in a usual manner. When the winding 48 is energized, the trip device is raised to permit the opening of the circuit breaker. Means for reclosing the breaker is not shown, in the interest of simplicity, but any conventional means may be employed.

In order to alter the characteristics of the relay when the current on the conductor 6 exceeds a certain magnitude, an auxiliary over-current relay 60 is provided which will pick-up when such value of current occurs, the winding of relay 60 being in series with the main winding 10 of the relay 8. The contacts of relay 60 are connected in series with a variable resistor 62 and a point W in one of the leads to the winding 28 of the saturable transformer, the other side of the circuit being connected to a point Z in a lead of the transformer secondary winding 32. Also a circuit connection is made between points X and Y, respectively, in the opposite leads of the transformer windings 28 and 32.

The effect of the above connections is more clearly illustrated in the schematic diagram of Fig. 2. It will be noted that upon closure of the contacts of relay 60 the transformer windings 28 and 32 are, in effect, shunted by a circuit including the adjustable impedance 62, which may be a variable resistor. Of course, with contacts of relay 60 open, the function of the transformer including coils 28 and 32, is not affected, that is, the relay windings 20 and 22 are energized from the transformer winding 32 the output of which is limited as the core 30 saturates. When the contacts of relay 60 close, however, the function of the transformer is altered by the shunt circuit thus established, and the degree of such alteration is determined by the selected value of adjustable impedance 62. Any such alteration of course serves to increase the energization of relay windings 20 and 22, and hence increase the speed of rotation of the armature 14 to shorten the response time of the relay.

Quite apparently, the time required for closing the relay contacts, upon the occurrence of an over-current of a predetermined magnitude as measured by relay 60, may be preselected over a wide range depending upon the possible degree of adjustment of impedance 62. In fact, when the impedance 62 is substantially shorted, the relay response will be almost instantaneous, as indicated in Fig. 3.

Referring to Fig. 3, it may be assumed that the over-current relay 60 is designed to pick up at a current value corresponding to point B on the curve. If the contacts of relay 60 are open, the circuit between points W and Z is incomplete and the operation of the relay in accordance with its normal calibration results, that is curve A—B—C.

If, however, contacts of relay 60 close and the resistor 62 is set at a calibrating value of 1 ohm, for example, the curve A—B—D will result because of increased energization of relay coils 20 and 22, giving an increased speed of operation for currents in excess of the B value. Similarly, if the tap of resistor 62 is moved to its extreme left-hand position resulting in a resistance of substantially zero, the transformer windings 28 and 32 are shunted by a low resistance circuit and the windings 20 and 22 of the relay are fully energized direct from the winding 26 of the relay.

This would result in the curve A—B—E of Fig. 3, which, it is noted, affords substantially instantaneous operation of the relay at the higher current values.

Under some circuit conditions, it may be desirable to prevent the relay from operating under excessive current conditions, such as currents too high for the capacity of the circuit breaker 4. In this case, upon operation of the relay 60, it may be desired to block the operation of the protective relay. This may be accomplished by reversing the connections between the contacts of relay 60 and the resistor 62 with respect to the transformer windings 28 and 32. As illustrated in Fig. 4, the connection between points X and Y in Fig. 2 has been changed to a connection between the points X and Z. Similarly, instead of the connection from the relay contacts to the point Z in Fig. 2, the connection is made between the contacts and point Y in Fig. 4. This reverses the energization of the windings 20 and 22 and tends to make the relay disk 14 operate in the opposite or contact opening direction.

Modifications will be apparent to those skilled in the art and in the light of the foregoing description, and it is intended that the invention be limited only by the spirit thereof.

I claim as my invention:

1. In a relay protective system for an electric circuit, a relay of the induction disc type including a main winding and means for energizing it in accordance with a characteristic of an electrical quantity of said circuit, a second winding and means for energizing it by transformer action from said main winding including a saturable transformer for limiting the energization of said second winding, and means operative in response to a predetermined characteristic of said quantity to increase the energization of said second winding, said means including a circuit automatically connected in shunt-circuit relation with respect to said saturable transformer upon the occurrence of said predetermined characteristic.

2. In a protective relay system for an electrical circuit, a relay of the induction disc type having a main winding and means for energizing it in accordance with the value of current traversing said circuit, a second winding and means for energizing it through a saturable transformer, said windings producing a shifting magnetic flux to influence the disc armature of the relay, and means responsive to a predetermined value of said current for increasing the energization of said second winding including means for establishing a shunt circuit around said saturable transformer including an adjustable impedance device.

3. In a protective relay system for an electrical circuit, a relay of the induction disc type including a core of magnetic material having spaced pole portions defining a gap in which a disc armature is rotatably mounted, a winding for one of said pole portions and means for energizing it in accordance with the magnitude of the current traversing said circuit, a second winding on another of said pole portions and means for energizing it including a current limiting device, said windings when energized producing a shifting magnetic flux to cause the rotation of said disc armature, an adjustable impedance device and means including a second relay responsive to a predetermined value of the current traversing said circuit for connecting said impedance device in shunt relation to said current limiting device to increase the energization of said second winding.

4. The relay system claimed in claim 3 in which the current limiting device is a saturable transformer and the means for connecting the adjustable impedance device in shunt relation thereto includes a circuit extending from a primary lead thereof to a secondary lead thereof with said impedance device and contacts of said second relay in series relation in said shunt circuit.

WILLIAM E. GLASSBURN.

REFERENCES CITED

The following references are of record in the file of this patent:

UNITED STATES PATENTS

| Number | Name | Date |
|---|---|---|
| 1,030,030 | Steen | June 18, 1912 |
| 2,112,098 | Johnson | Mar. 22, 1938 |
| 2,372,134 | Steeb | Mar. 20, 1945 |